(12) United States Patent
Jeffers et al.

(10) Patent No.: US 6,372,338 B1
(45) Date of Patent: Apr. 16, 2002

(54) SPHERICAL MAGNETIC PARTICLES FOR MAGNETIC RECORDING MEDIA

(75) Inventors: Frederick J. Jeffers, Escondido; Bradford D. West, La Jolla, both of CA (US); Robert O. James, Rochester, NY (US); Frederick R. Chamberlain, IV, Leucadia; Neil Smith, San Jose, both of CA (US); Ronald M. Wexler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/196,009

(22) Filed: Nov. 19, 1998

Related U.S. Application Data

(60) Provisional application No. 60/068,143, filed on Dec. 12, 1997.

(51) Int. Cl.[7] ............................................. G11B 05/714
(52) U.S. Cl. ................ 428/329; 428/323; 428/694 BA; 428/694 BH; 428/694 ST; 428/900
(58) Field of Search ................................. 428/323, 329, 428/694 BA, 694 BH, 900, 694 ST

(56) References Cited

U.S. PATENT DOCUMENTS

| | | | |
|---|---|---|---|
| 4,493,874 A | * | 1/1985 | Kubo et al. ................. 428/403 |
| 4,945,049 A | | 7/1990 | Hamaya et al. |
| 5,215,874 A | | 6/1993 | Sakakibara |
| 5,229,259 A | | 7/1993 | Yokota |
| 5,256,479 A | * | 10/1993 | Tokuoka et al. ............ 428/328 |
| 5,318,826 A | | 6/1994 | Yasufuku et al. |
| 5,413,900 A | | 5/1995 | Yokota |
| 5,498,512 A | | 3/1996 | James et al. |
| 5,520,954 A | | 5/1996 | Oltean et al. |
| 5,629,075 A | * | 5/1997 | Ishikawa et al. ............ 428/216 |
| 5,792,570 A | * | 8/1998 | Ishikawa et al. ...... 428/694 BA |
| 6,017,667 A | * | 1/2000 | Hakata .................... 430/106.6 |

FOREIGN PATENT DOCUMENTS

| | | |
|---|---|---|
| EP | 0 313 063 | 4/1989 |
| EP | 0 603 582 | 6/1994 |
| EP | 0 696 779 | 2/1996 |
| EP | 0 736 840 | 10/1996 |
| JP | 08 180378 | 7/1996 |

* cited by examiner

*Primary Examiner*—Stevan A. Resan
(74) *Attorney, Agent, or Firm*—William F. Noval

(57) ABSTRACT

A particulate magnetic recording media wherein the magnetic particles are substantially spherical. The spherical particle shape makes possible a media which is magnetically isotropic, well dispersed and low in noise, and free of magnetically inferior broken particles.

20 Claims, 10 Drawing Sheets

SPHERICAL MAGNETIC PARTICLES FOR MAGNETIC RECORDING MEDIA

CROSS REFERENCE TO RELATED APPLICATION

Reference is made to and priority claimed from U.S. Provisional Application Ser. No. U.S. 60/068,143, filed Dec. 12, 1997, entitled SPHERICAL MAGNETIC PARTICLES FOR MAGNETIC RECORDING MEDIA.

FIELD OF THE INVENTION

This invention relates to magnetic particles used to make magnetic recording media. It is shown that particles having a nearly spherical or equiaxed shape have many important advantages over the acicular or platelet shaped conventional particles.

BACKGROUND OF THE INVENTION

There are two quite different particle shapes used in conventional particulate magnetic recording media. The most often used particles (e.g. iron oxide ($Fe_2O_3$), metallic iron (Fe) and chromium dioxide ($CrO_2$)), are highly acicular or cigar shaped. The energetically preferred or "magnetic easy axis" of these acicular particles is parallel to the length of the particle. The magnetic characteristics arise from the "shape anisotropy energy" and are a first order function of the length to diameter ratio of the particles.

The other type of particles used, such as Barium Ferrite or Strontium Ferrite (BaFe and SrFe), are platelet or tabular in shape, with the easy axis perpendicular to the plane of the platelet. Their magnetic characteristics arise primarily from internal "crystalline anisotropy", and are only a second order function of the size or aspect ratio of the particle.

Regardless of the shape of the particle, for particulate recording media, optimal conventional longitudinal recording performance is obtained when the easy axes of the particles are oriented parallel to the media travel direction.

Coating Shear Anisotropy

The magnetic layer of conventional particulate recording media is deposited from a liquid dispersion by some type of web coating technique. The viscous fluid shear involved in this process, and the particle shape, generate torque on the particles that results in at least a moderate degree of particle orientation. This produces a magnetic anisotropy in the coated layer.

In the case where acicular particles are being used to make magnetic tape, the resulting minimum magnetic energy or "easy" axis orientation is parallel to the tape motion. Hence, the shear orientation makes the desired longitudinal magnetic orientation of the tape somewhat easier to accomplish.

In the case where acicular particles are being used to make floppy disks, the shear orientation results in a uniaxial, rather than the desired circumferential, magnetic anisotropy in the plane of the disk. This produces an undesirable twice-around modulation in the magnetic properties of the disk. Special magnet assemblies are employed to disorient the particles after coating. This is done in an effort to make the magnetic layer more isotropic in the plane of the disk.

When the platelet shaped BaFe particle is being web coated, the viscous shear torques cause the particle magnetic easy axes to be at least partly oriented perpendicular to the plane of the coated layer. In conventional longitudinal recording applications, this results in signal amplitude loss and distortion. To solve this problem when coating BaFe tape, an orienting magnetic field is applied to cause the particle easy axes to align parallel with the tape length.

In making web coated floppy disks with BaFe, using an orienting field is not possible. There is no twice around modulation of the magnetic properties, but the signal amplitude loss and distortion, resulting from the vertical shear orientation, limit the performance of BaFe floppy disks. Disorienting magnets similar to those discussed above are sometimes used to minimize this problem.

Particle Shape and the Dispersion Process

By their magnetic nature, magnetic particles tend to form together in clumps. These particle clumps result in an important source of noise in the recording layer and hence the powders must be well dispersed prior to coating. The dispersion is typically carried out in some form of high shear ball mill. This process subjects the particles to considerable impact, which tends to cause particle breakage, since the tiny crystalline particles are rather fragile. Broken particles have very inferior magnetic properties, which severely degrade the performance of the magnetic layer. The dispersion process with conventional acicular or platelet particles is always a tradeoff between the dispersion quality (lack of clumps) and the number of broken particles.

Because the magnetic easy axes of the BaFe particles are perpendicular to the plane of the platelet, they tend to clump together in stacks like poker chips. This large area of contact makes them very difficult to separate without breakage and leads to a less than optimum dispersion or many broken particles having degraded magnetic properties.

Acicular particles tend to form pairs of particles, oriented in opposite directions, which have at most a line contact between the pairs. They are thus somewhat easier to separate than the platelet shaped BaFe. On the other hand, the long thin shape of the acicular particles makes them more prone to breakage, and the magnetic characteristics of this type of particle degrade much more quickly as particle breakage occurs. This is because the magnetic hardness of acicular particles is determined by their length to diameter ratio.

Extruded or Co-extruded All-Magnetic Card or Co-extruded Media and Shear Orientation A new all-magnetic card, described in copending applications listed above, utilizes high coercivity BaFe particles uniformly distributed throughout the volume of the card. The card is useful as a credit card, as well as many other possible applications, and can be recorded anywhere on the surface of the card, as well as on the card edges. The high coercivity BaFe particles may also be used in other applications, such as co-extruded resin for photographic paper, photographic film, inkjet media, or thermal diffusion dye transfer media. Particularly useful embodiments are the use of high coercivity BaFe particles in imaging supports such as those described in U.S. Ser. No. 08/862,703, filed May 23, 1997, entitled "Composite Photographic Material with Laminated Biaxially Oriented Polyolefin Sheet," by R. Bourdelais et al.; U.S. Ser. No. 08/862,234, filed May 23, 1997, entitled "Photographic Element with Indicia on Oriented Polymer Back Sheet," by R. Bourdelais et al.; U.S. Ser. No. 08/862,901, filed May 23, 1997, entitled "Photographic Element with Bonding Layer on Oriented Sheet," by R. Bourdelais et al.; U.S. Ser. No. 09/154,881, filed Sep. 17, 1998, entitled "Photographic Transmission Display Materials with Biaxially Oriented Polyolefin Sheet," by P. Aylward et al.; U.S. Ser. No. 09/154,900, filed Sep. 17, 1998, entitled "Translucent Display Paper with Biaxially Oriented Polyolefin Sheets," by P. Aylward et al.; and U.S. Ser. No. 09/154,692, filed Sep. 17, 1998, entitled "Transmission Imaging Display Material with Biaxially Oriented Polyolefin Sheet," by P. Aylward et al.

The recording medium may be co-extruded as one layer or as a multilayer structure that can be employed as a photographic element. For example, it could form a recording layer on a photographic image support on the side opposite the imaging layers. Such supports may be used to support images made by processes such as silver halide photography, inkjet, thermal diffusion dye transfer, and the like.

The high coercivity BaFe particles used in the all magnetic card have the conventional hexagonal platelet shape. The standard thermoplastic extrusion process used to form the cards, paper, film or other media involves very high viscous shear and considerable stretching. These, together with the platelet shape of the particle, result in the particles being almost completely oriented with the plane of the platelets parallel to the surface of the card. As in the case of the web coated BaFe layers, this orients the BaFe particle easy axes perpendicular to the plane of the card, and the result is considerable signal amplitude loss and distortion.

The same tradeoff between dispersion quality and magnetic degradation due to particle breakage discussed above, in connection with coated magnetic layers, also occurs with the all-magnetic card or other imaging supports mentioned above. The magnetic properties of BaFe are a second order function of particle size, but breakage caused by excessive milling gives rise to crystal defects in the particle fragments. These defects severely degrade the magnetic properties of the all magnetic card. The coercivity and remanent magnetization are dramatically reduced.

The prior art solution to the vertical orientation problem is to apply an orienting magnctic field during the extrusion process. The extrusion occurs at a temperature of 240° C. to 280° C. or more. At these temperatures, the magnetic moment and anisotropy of BaFe are reduced from their room temperature values. The result is a lower than desired magnetic torque per unit aligning field.

The field is supplied by a multiturn coil located around the exit slot of the extrusion device. Practical aspects of coil and power supply design result in a maximum aligning field of a few hundred Oe. This relatively low field and reduced magnetic moment limit the aligning torque Even at 280° C., the plastic viscosity is rather high, hence the particle rotation rate per unit torque is small. The optimum extruded plastic flow rate can be as high as several inches per second. The length of the aligning field coil is limited by mechanical details. Hence the path length of the region of high orienting field is short. These facts limit the time available to orient the particles.

At high flow rates, and ideal extrusion conditions needed for economical and quality card or imaging support production, the low aligning field and short alignment time, taken together with the low magnetic moment of the particle at the 280° C. temperature, result in less than optimum particle orientation parallel to the length of the card or imaging support.

Stretching involved in the extrusion process also tends to orient the BaFe particles in the perpendicular direction. This stretching occurs in zero field regions after extrusion has occurred and tends to counteract the longitudinal orientation created by the aligning field.

SUMMARY OF THE INVENTION

According to the present invention, there is provided a solution to the above listed problems of the prior art.

According to a feature of the present invention, there is provided a spherical or substantially spherical magnetic particle for the production of high quality magnetic recording media.

ADVANTAGEOUS EFFECT OF THE INVENTION

The invention has the following advantages.

1. The spherical or equiaxed particle will not undergo shear orientation during standard magnetic media coating processes, or during all magnetic card extrusion. The media will be magnetically isotropic as fabricated.

2. Because of Item 1, the as fabricated magnetic media will exhibit minimal signal reduction and distortion or twice around magnetic property modulation. The magnetic media will not require magnetic orientation. This will make the media production process much more efficient and inexpensive.

3. Because of the round shape of the particle, the viscous resistance to magnetic orientation will be reduced and magnetic orientation, if desired, can be accomplished more effectively with a lower magnetic field.

4. Because of the point contact between the spherical particles, they will be much easier to disperse than prior art particles.

5. The spherical or equiaxed particle will be very resistant to breakage during dispersion.

6. Because of Items 4 and 5, with the spherical or equiaxed particle of the invention, it will be possible to make a very well dispersed and hence low noise magnetic recording medium having ideal magnetic properties.

DETAILED DESCRIPTION OF THE INVENTION

Figure 1A:
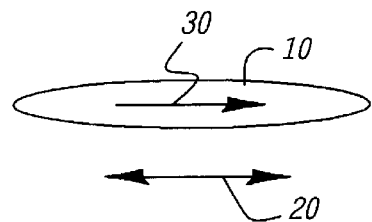
FIGS. 1a–1c are respective views of acicular magnetic particles showing the magnetic easy axis, a particle clump, and a broken particle.

Referring to FIG. 1a, there is shown a conventional prior art acicular magnetic particle 10, which may be $Fe_2O_3$, metallic Fe, or $CrO_2$. Also shown is the axis of minimum magnetic energy, the easy axis 20, which is parallel to the length of the particle. The magnetic moment vector 30 is also shown, and may point in either direction parallel to the length of the particle.

Figure 2:
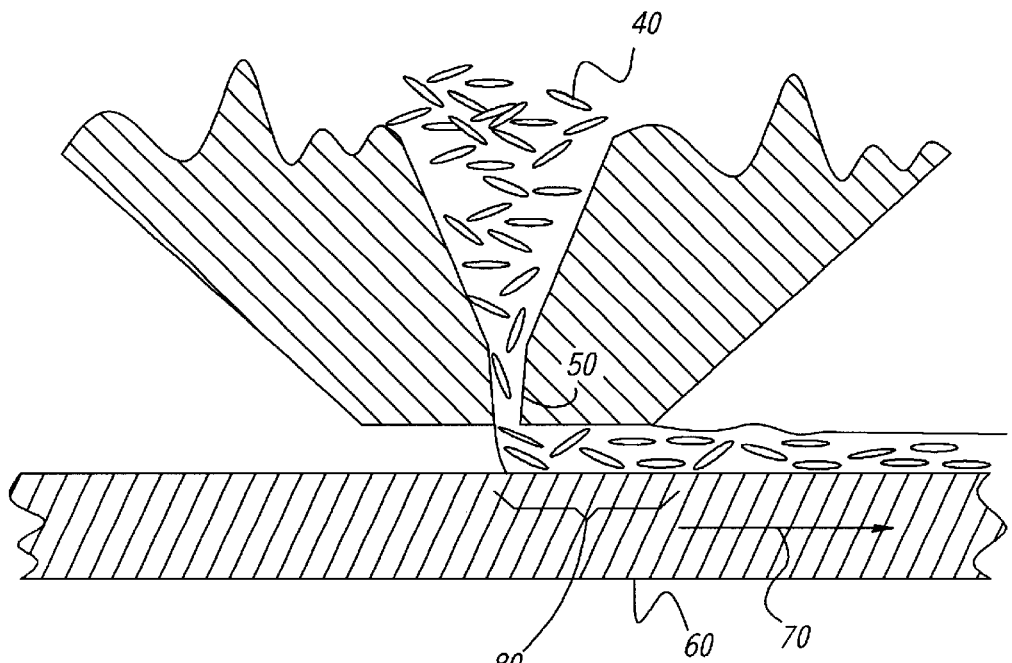
FIG. 2 is a schematic cross-section of the web coating process.

FIG. 2 shows a cross-section sketch of a typical web coating process. The dispersion 40 is forced out through the coating slot 50 onto the moving substrate 60, which is moving as shown by the arrow 70. As illustrated, the particles 10 are partially aligned with the substrate travel direction by the shear torques in the coating region 80.

Figure 1C:
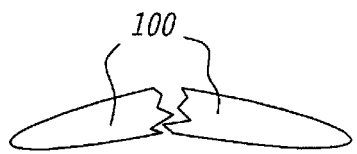
Figure 1B:
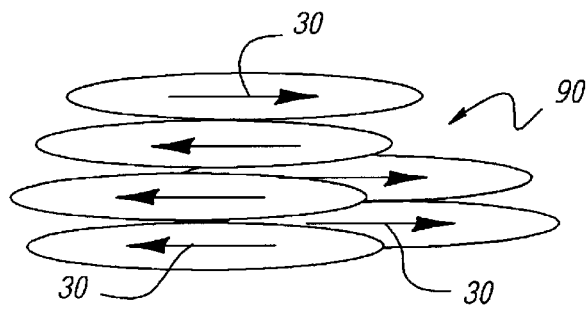

FIG. 1b shows a clump of acicular particles 90 where the particle magnetic moments 30 are in opposite directions. FIG. 1c shows an acicular particle 100 as broken during dispersion.

Figure 3A:
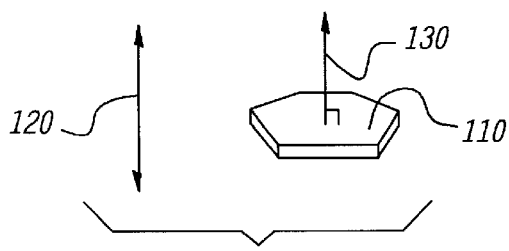
FIGS. 3a–3c are respective views of platelet BaFe particles showing the magnetic easy axis, a particle stack, and a broken particle, respectively.
Figure 3B:
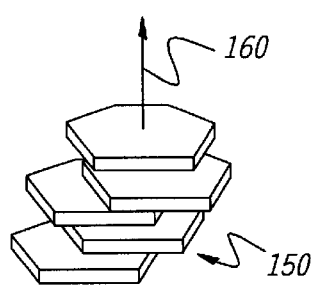
Figure 3C:
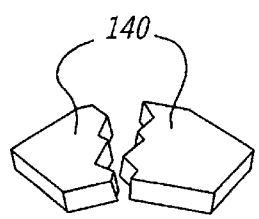

FIG. 3a shows a BaFe (or strontium ferrite) platelet shaped particle 110. Also shown is the easy axis 120 which is perpendicular to the platelet surface, and the magnetic moment vector 130 which is also perpendicular to the platelet plane, and may point in either direction.

Figure 4:
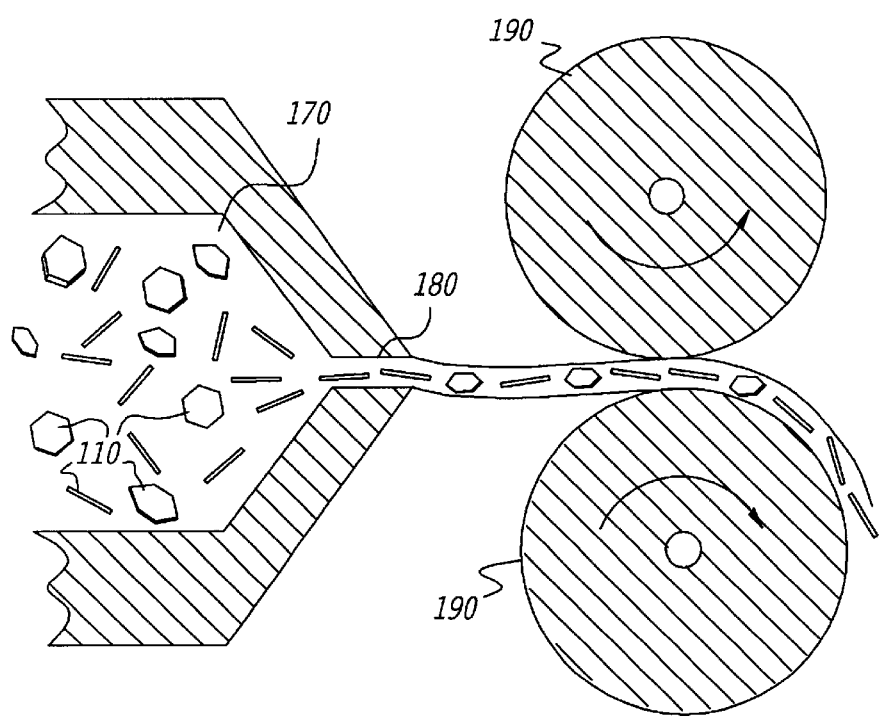
FIG. 4 is a schematic cross-section of the all magnetic card or imaging support extrusion process.

FIG. 4 shows a cross-section sketch of the all magnetic card or imaging support extrusion process. The particles 110, dispersed in hot thermoplastic 140, are forced at high pressure out through the extrusion slot 180, and caught on cooling rollers 190. The shear torques occurring in the slot 180, and the stretching which occurs between the slot 180 and the rollers 190, combined with the platelet shape of the particles, results in the plane of the platelet being parallel to the surface of the card. Since the easy axis of the particle 120 (from FIG. 3a) is perpendicular to the plane of the particle, the shear orientation causes the easy axis to be perpendicular to the surface of the card or imaging support.

Figure 5A:
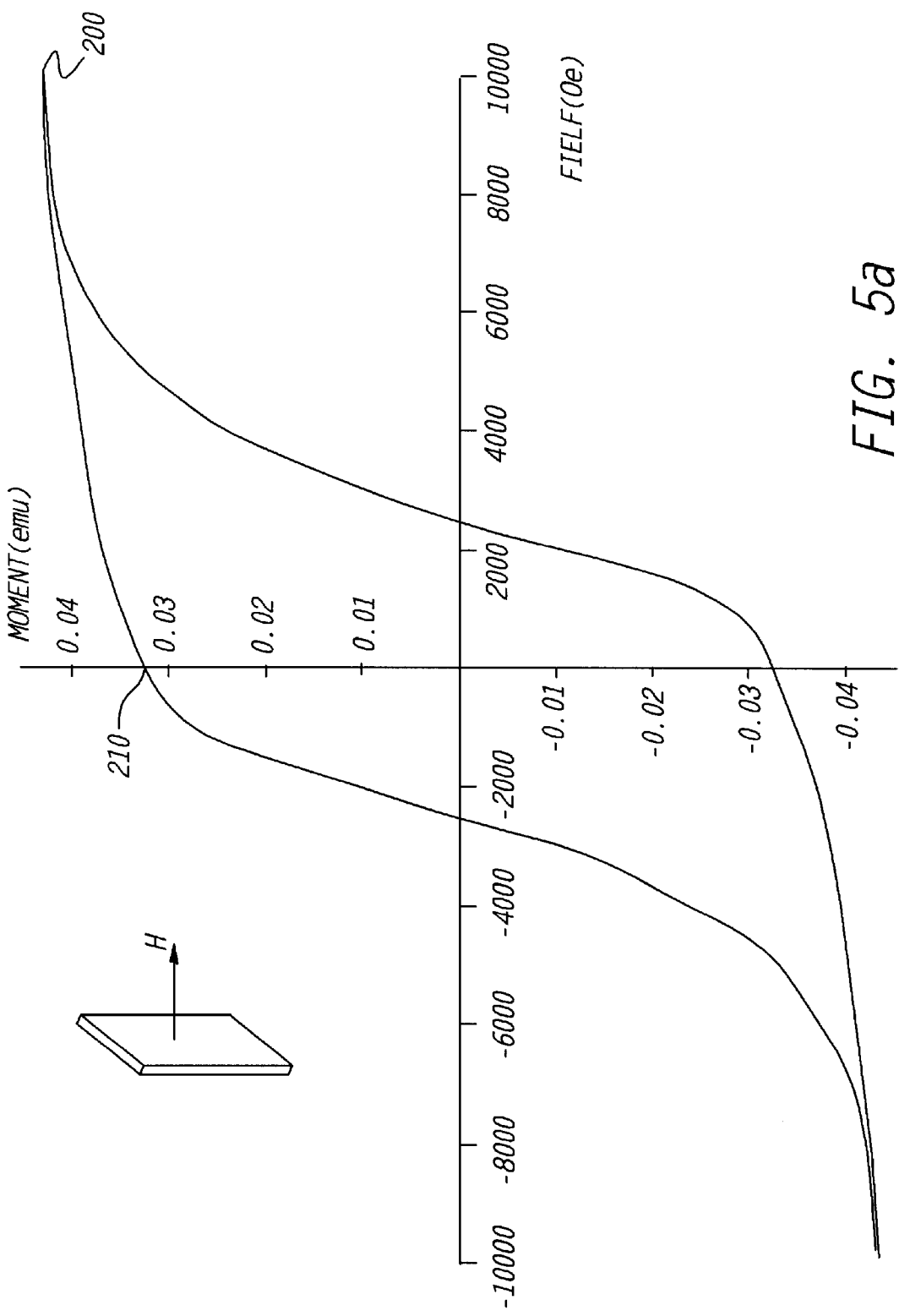
FIGS. 5a and 5b are perpendicular and longitudinal M-H loops of an all magnetic card made with platelet shaped BaFe particles, wherein no aligning magnetic field was applied during extrusion.

FIG. 5a shows an M-H loop of an all magnetic card measured perpendicular to the card surface. No aligning magnetic field was applied during fabrication. The saturation magnetization Ms is denoted by 200, while 210 is the remanent magnetization Mr. The squareness ratio Mr/Ms is 76%, indicating that most of the particles are oriented with their easy axes close to the perpendicular direction.

Figure 5B:
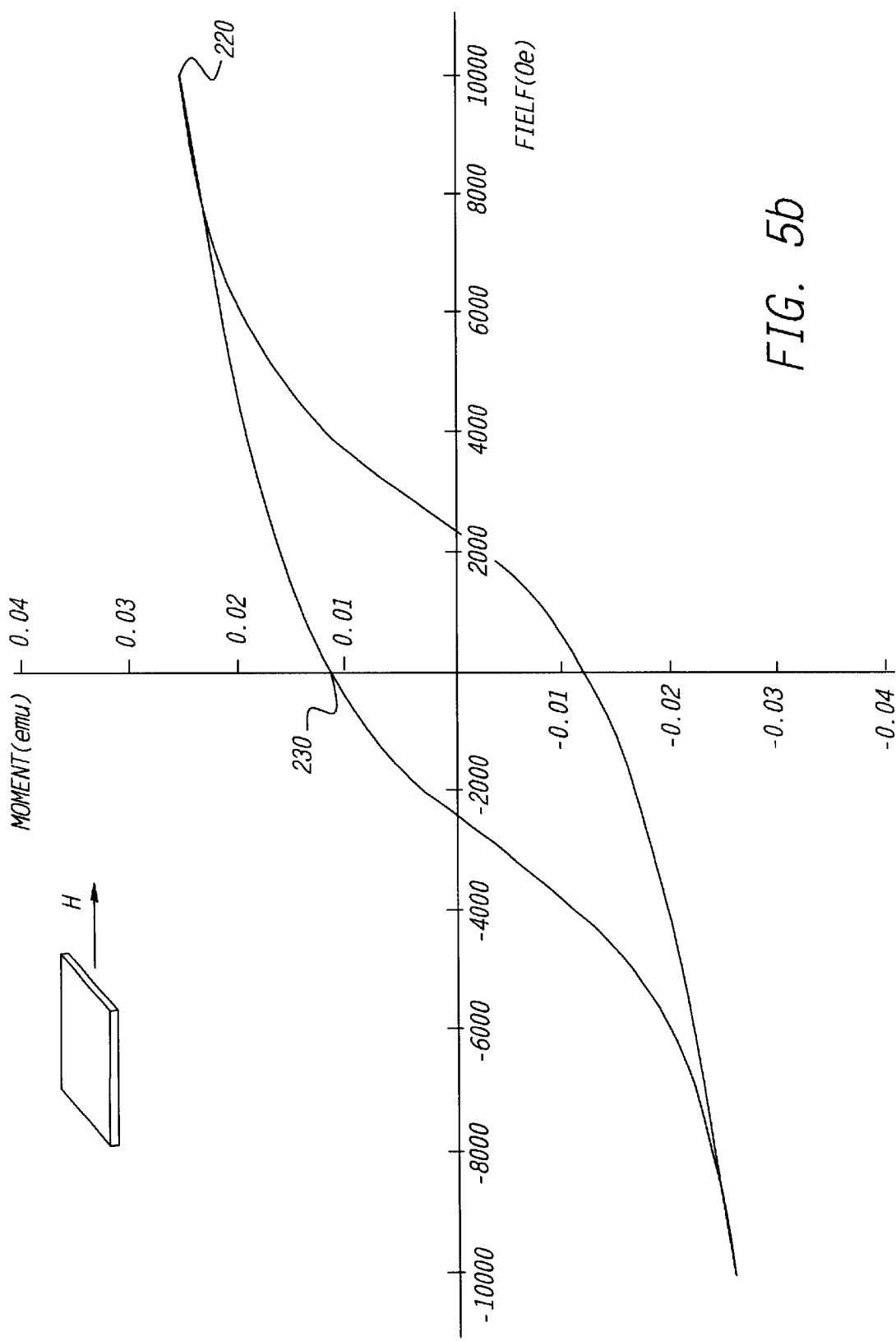

FIG. 5b shows an M-H loop measured in the card length direction. The saturation magnetization Ms is denoted by 220 and the remanent magnetization Mr is denoted by 230. The Mr/Ms ratio in this direction is only 45%. This confirms the earlier conclusion that most of the particle easy axes are oriented nearly perpendicular to the card surface.

Figure 5C:
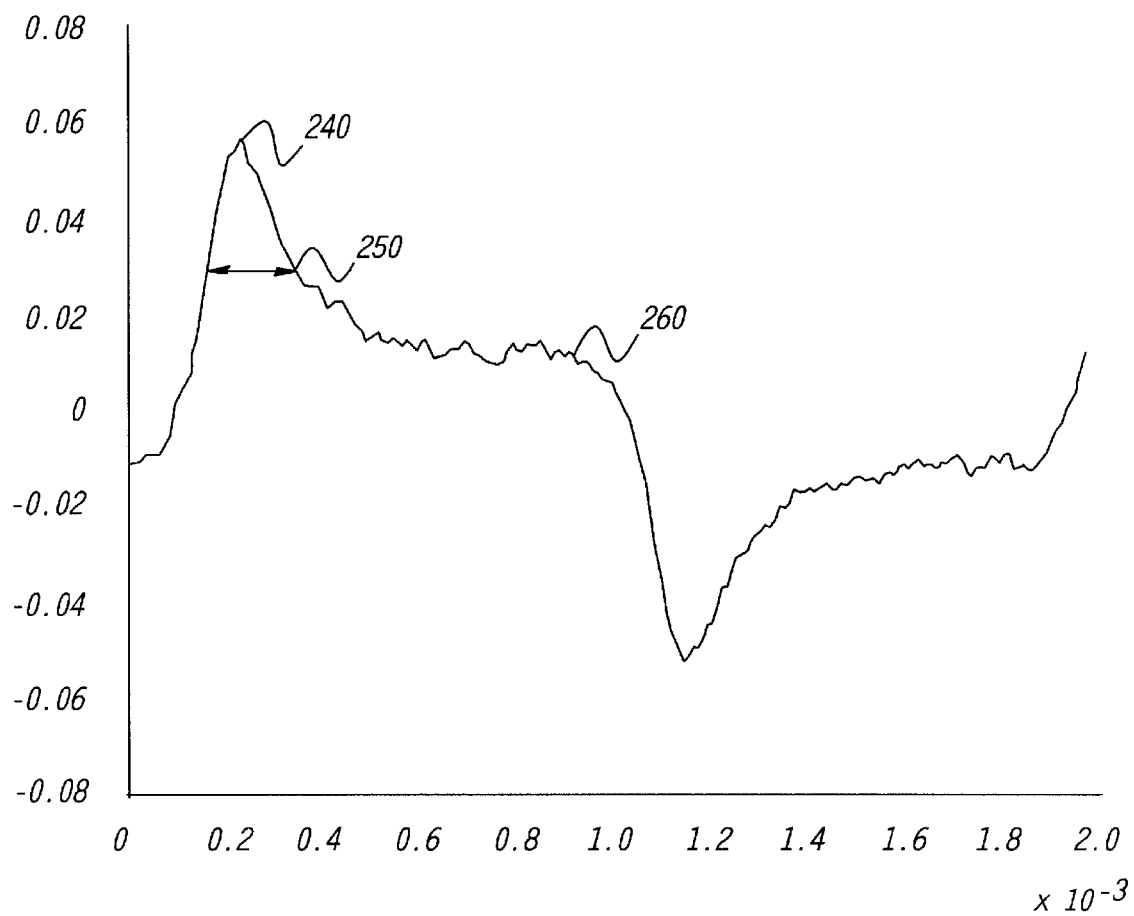
FIG. 5c is a plot of the signal reproduced from the card or imaging support of FIGS. 5a and 5b.

FIG. 5c shows the signal waveform obtained from the card of FIGS. 5a and 5b. The signal amplitude 240 is reduced, the full pulse width at half maximum, PW(50), 250 is large, and there is an appreciable shoulder 260. In order to reliably detect digital data, it is necessary to have a large signal 240, and hence a large signal to noise ratio (SNR), a small PW(50) 250, and minimal shoulder 260.

The spherical particle of the present invention will rotate somewhat, under the influence of the viscous flow shear torques involved with the web coating of conventional media, and the plastic extrusion process of the all magnetic card or imaging support. However, since the particle is spherical, there is no relationship between the anisotropy axes and the direction of shear rotation. For every particle that is rotated toward a given direction, another will be rotated away by the same amount. Hence the result will be a layer, or an all magnetic card or imaging support, which is magnetically isotropic.

Figure 6A:
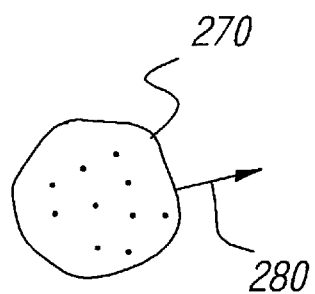
FIGS. 6a–6b are respective views of spherical particles of the present invention showing the magnetic moment, a clump of particles and a point contact between the particles.
Figure 6C:
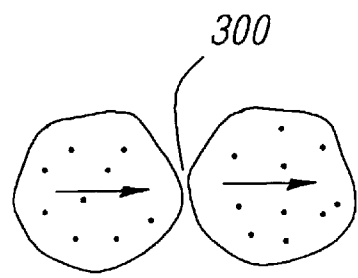
Figure 6B:
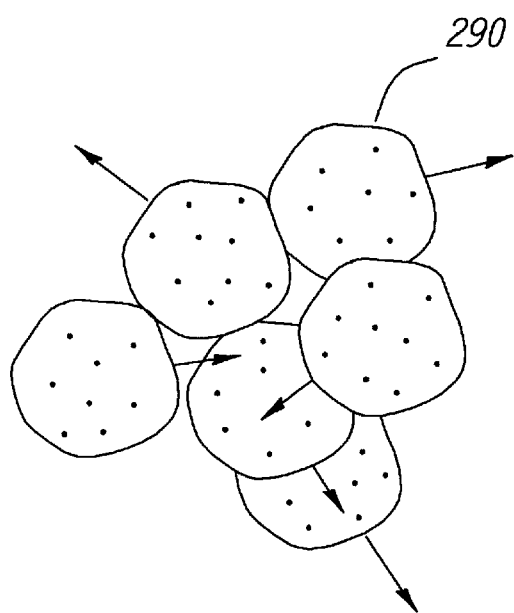

FIG. 6a shows a high coercivity spherical particle of the present invention 270. Also shown is the magnetic moment 280. FIG. 6b shows a clump of spherical particles 290, wherein only a point contact 300 can occur between pairs of particles. Because of this point contact, the magnetic forces holding the particles together are comparatively low and the clumps are more easily dispersed. The spherical shape of the particles makes them highly resistant to breakage during dispersion. Thus, spherical particles of the present invention make possible a very well dispersed, and hence low noise, media whose magnetic properties are not degraded by particle breakage.

Figure 7A:
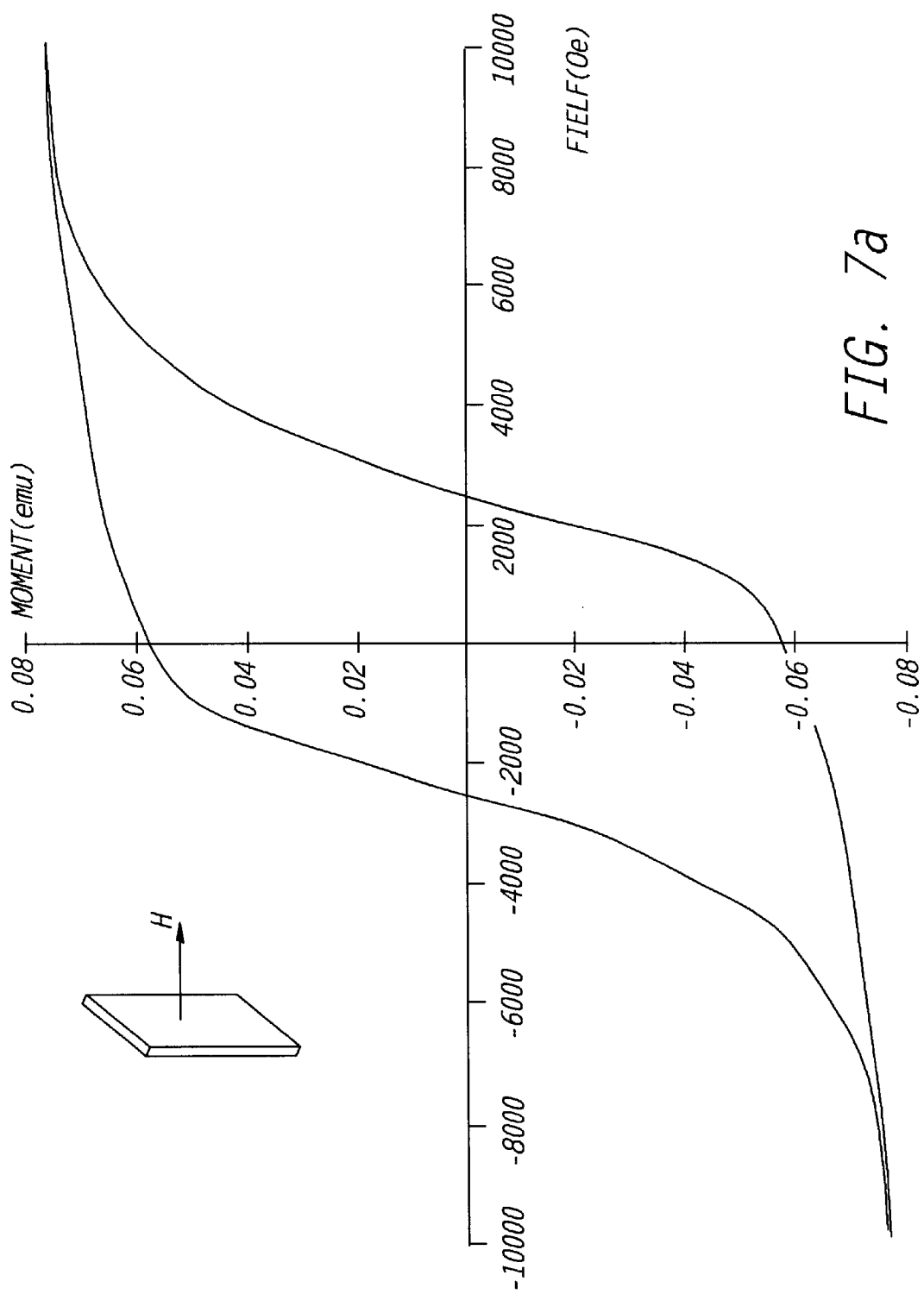
FIGS. 7a and 7b are perpendicular and longitudinal M-H loops of an all magnetic card, made with prior art platelet shaped BaFe particles, which was extruded with just enough aligning magnetic field to give similar magnetic properties in both directions.

FIG. 7a shows a plot of the vertical M-H loop obtained from a card or imaging support, otherwise identical to that of FIG. 5, which was extruded with just enough aligning field to give nearly isotropic magnetic properties. This was done to mimic the isotropic magnetic properties of a card or imaging support made using the spherical particles of the present invention, since such particles are not yet available.

Figure 7B:
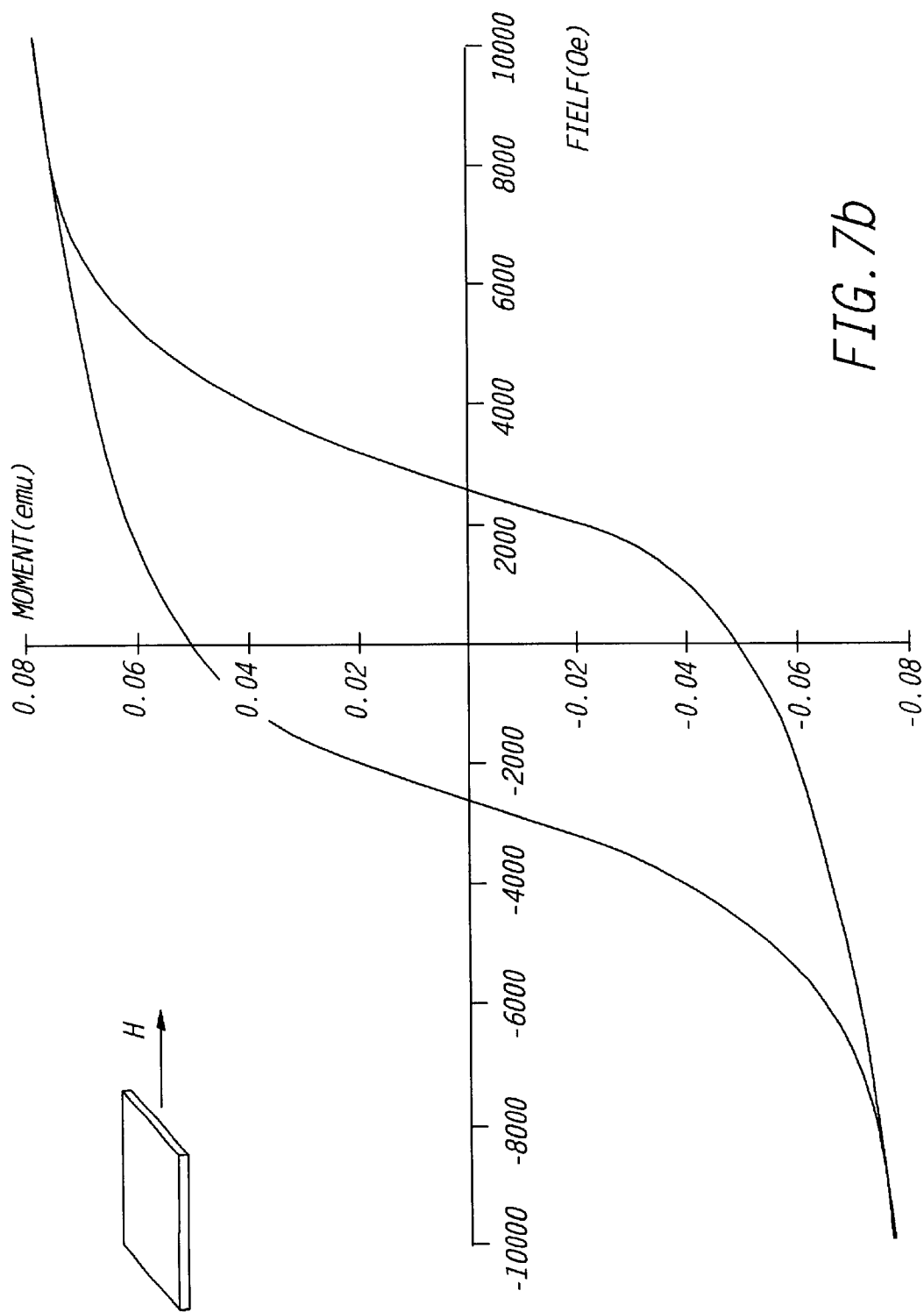

FIG. 7b shows a plot of the longitudinal M-H loop of the card or imaging support of FIG. 7a. As can be seen, the loops of FIGS. 7a and 7b are quite similar. This indicates that, unlike the nearly perpendicularly oriented card of FIG. 5, this card or imaging support has essentially isotropic magnetic properties.

Figure 7C:
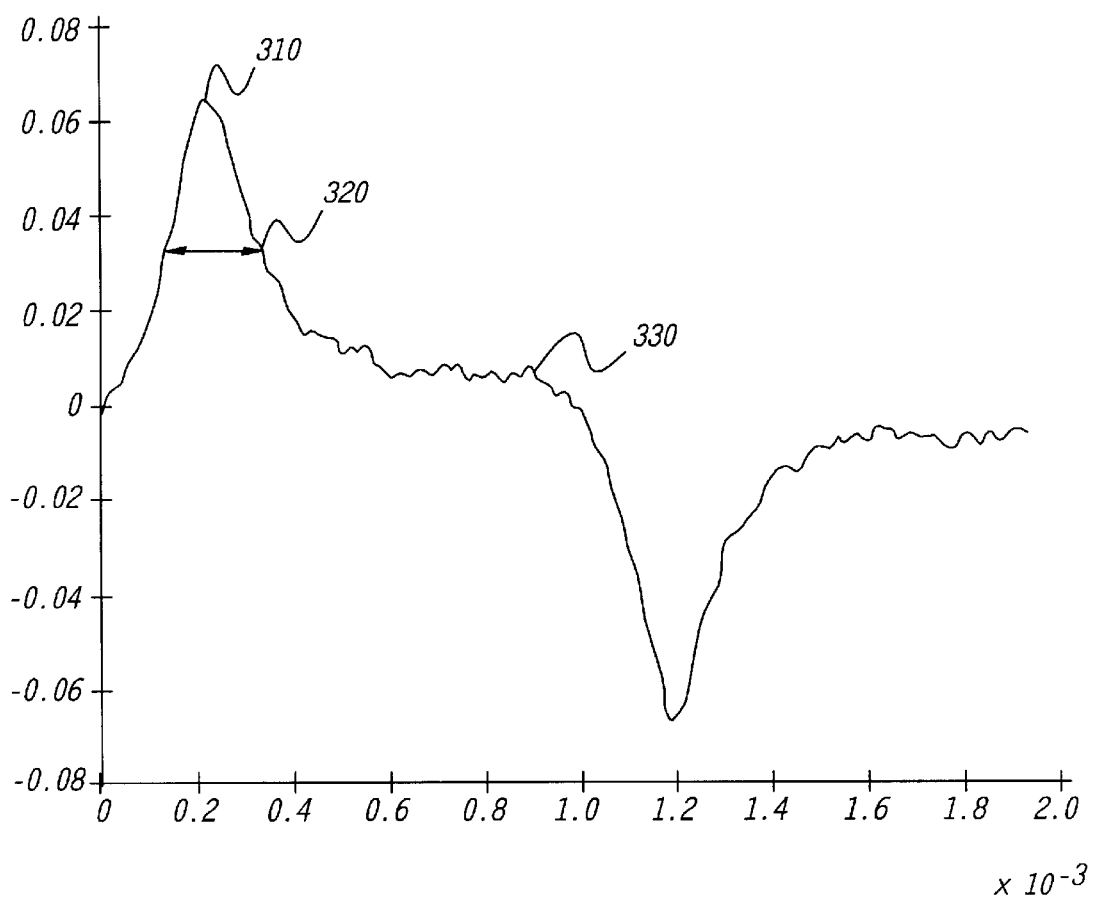
FIG. 7c is a plot of the signal waveform from the all magnetic card of FIGS. 6a and 6b.

FIG. 7c shows a plot of the signal waveform of the card or imaging support of FIGS. 7a and 7b. Comparing the signal waveform of the perpendicularly shear oriented card or imaging support, FIG. 5c, to that of the isotropic card or imaging support FIG. 7c, it is found that the isotropic card or imaging support has a 15% higher signal, roughly the same PW(50), and a shoulder which is smaller by a factor of more than 2. It is argued here that the spherical particle of the present invention would give similar or superior recording performance advantages over the perpendicularly oriented card or imaging support of FIG. 5.

Finally, if magnetic orientation is desired, so as to further improve the recording properties of magnetic tape or all magnetic cards or imaging support, the spherical particle will exhibit less viscous drag and hence will be more easily oriented by the orienting field. This will give further improved performance and more efficient fabrication.

Figure 8:
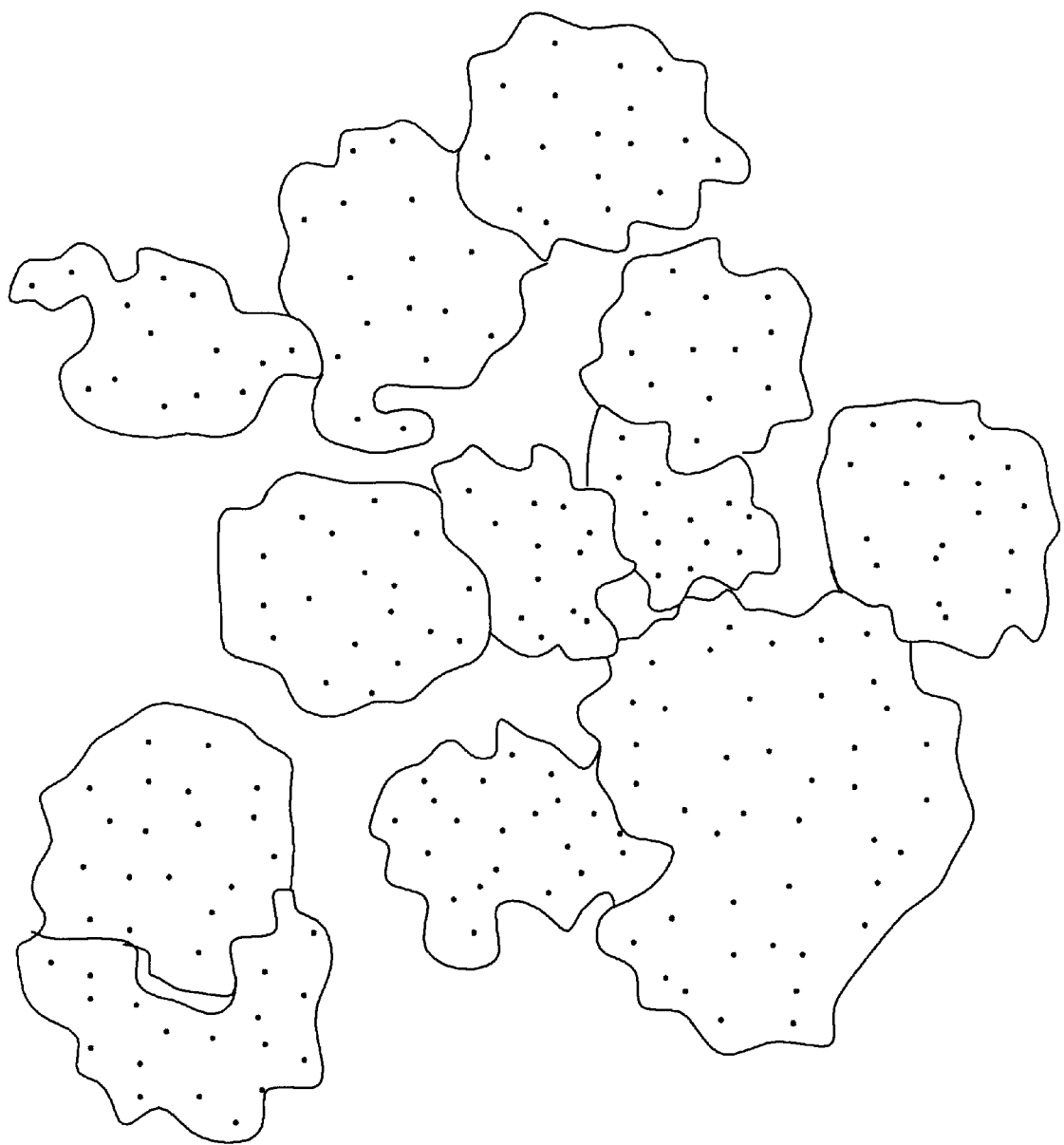
FIG. 8 is a transmission electron microscope micrograph of experimental spherical BaFe magnetic particles.

High coercivity spherical particles are not yet available in sufficient quantities to make media. However small experimental samples have been made by Dr. Yan-ki Hong of the University of Idaho. FIG. 8 shows a transmission electron microscope micrograph of spherical BaFe particles.

The invention has been described in detail with particular reference to certain preferred embodiments thereof, but it will be understood that variations and modifications can be effected within the spirit and scope of the invention.

PARTS LIST

10 Prior art acicular magnetic particle
20 Magnetic anisotropy easy axis of acicular particle
30 Magnetic moment vector of anisotropic particle
40 Dispersion of particles being web coated
50 Web coating orifice
60 Web substrate
70 Direction of web travel during coating
80 Region of high shear
90 Clump of prior art acicular particles
100 Broken acicular particle
110 Platelet shaped Barium Ferrite particle
120 Magnetic anisotropy easy axis of platelet shaped particle
130 Magnetic moment vector of platelet shaped particle
140 Broken platelet shaped particle.
150 Stack of platelet shaped particles
160 Magnetic moment vector of platelet shaped particle in a stack
170 Dispersion of platelet shaped particle in all magnetic card or imaging support extruder
180 Extrusion orifice
190 Extruder rollers
200 Saturation magnetic moment of prior art Barium Ferrite all magnetic card or imaging support
210 Remanent magnetic moment of prior art Barium Ferrite card measured perpendicular to the card or imaging support surface
220 Magnetic moment of prior art Barium Ferrite card or imaging support at 10,000 Oe measured parallel to the card length
230 Remanent magnetic moment of prior art Barium Ferrite card or imaging support measured parallel to the card length 240 Peak Signal read from prior art Barium Ferrite card or imaging support
250 Full width at half maximum, PW(50), of signal from prior art Barium Ferrite card or imaging support
260 Shoulder distortion in signal from prior art Barium Ferrite card or imaging support
270 Substantially spherical magnetic particle of the present invention
280 Magnetic moment vector of spherical particle
290 Clump of spherical particles
300 Point contact between two spherical particles
310 Peak signal read from prototype isotropic Barium Ferrite card or imaging support
320 PW(50) of signal from isotropic Barium Ferrite card or imaging support
330 Shoulder distortion of signal from isotropic card or imaging support

What is claimed is:

1. A magnetically isotropic magnetic recording media consisting of one of barium ferrite or strontium ferrite particles being substantially spherical in shape and having an intrinsic coercivity of more than 1000 Oe.

2. The media of claim 1 wherein no magnetic field is applied during fabrication and the magnetic properties of the media are isotropic.

3. The recording media of claim 1 wherein each of the three principle orthogonal dimensions of a given particle vary by no more than plus or minus 25% from the average of the three dimensions of that given particle.

4. The media of claim 1 wherein the average dimension of the substantially spherical particles is less than 5 micrometers and more than 10 nanometers.

5. The media of claim 1 wherein the media is in the form of a floppy disk.

6. The media of claim 1 wherein the media is in the form of a tape.

7. The media of claim 1 wherein the media is made up of plastic material in the form of an encodable card or imaging support, and wherein the spherical magnetic particles are uniformly dispersed throughout the plastic material.

8. The media of claim 7 wherein the imagining support comprises a silver halide photographic support, inkjet support, or thermal diffusion dye transfer support.

9. The media of claim 8 wherein the silver halide photographic support comprises a reflective support.

10. The media of claim 8 wherein the silver halide photographic support comprises a transparent support.

11. The media of claim 1 wherein the media is in the form of a plastic card or imaging support having the uniformly dispersed spherical particles coated or laminated on one or both surfaces of said card or imaging support.

12. The media of claim 11 wherein the imaging support comprises a silver halide photographic support, inkjet support, or thermal diffusion dye transfer support.

13. The media of claim 12 wherein the silver halide photographic support comprises a reflective support.

14. The media of claim 12 wherein the silver halide photographic support comprises a transparent support.

15. The media of claim 1 wherein the media is in the form of a two layer coextruded plastic strip having one layer containing spherical magnetic particles and one layer serving as the substrate.

16. The media of claim 1 wherein the particles are made of Barium Ferrite.

17. The media of claim 1 wherein the particles are made of Strontium Ferrite.

18. The media of claim 1 wherein the particles have an intrinsic coercivity of more than 1000 Oe and less than 10,000 Oe.

19. The media of claim 1 wherein the volumetric concentration of the substantially spherical particles is less than 5% and more than 0.005%.

20. The media of claim 1 wherein the volumetric concentration of the substantially spherical particles is greater than 5% and less than 50%.

* * * * *